United States Patent
Choi et al.

(10) Patent No.: US 12,315,236 B2
(45) Date of Patent: May 27, 2025

(54) METHOD AND DEVICE FOR MULTI-SENSOR DATA-BASED FUSION INFORMATION GENERATION FOR 360-DEGREE DETECTION AND RECOGNITION OF SURROUNDING OBJECT

(71) Applicant: IUCF-HYU (INDUSTRY-UNIVERSITY COOPERATION FOUNDATION HANYANG UNIVERSITY), Seoul (KR)

(72) Inventors: Jun-Won Choi, Seoul (KR); Jin Hyeok Yoo, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 375 days.

(21) Appl. No.: 17/801,414

(22) PCT Filed: Aug. 11, 2020

(86) PCT No.: PCT/KR2020/010619
§ 371 (c)(1),
(2) Date: Aug. 22, 2022

(87) PCT Pub. No.: WO2021/167189
PCT Pub. Date: Aug. 26, 2021

(65) Prior Publication Data
US 2023/0082097 A1    Mar. 16, 2023

(30) Foreign Application Priority Data
Feb. 21, 2020   (KR) ............ 10-2020-0021417

(51) Int. Cl.
*G06V 10/82*   (2022.01)
*G06V 10/80*   (2022.01)
*G06V 20/56*   (2022.01)

(52) U.S. Cl.
CPC ............ *G06V 10/811* (2022.01); *G06V 10/82* (2022.01); *G06V 20/56* (2022.01); *G06V 2201/12* (2022.01)

(58) Field of Classification Search
CPC ...... G06V 10/811; G06V 10/82; G06V 20/56; G06V 2201/12; G06V 10/40;
(Continued)

(56) References Cited

U.S. PATENT DOCUMENTS 10,408,939 B1 * 9/2019 Kim .................. G06N 3/08
2019/0371052 A1 * 12/2019 Kehl .................. G01C 21/3602
(Continued)

FOREIGN PATENT DOCUMENTS

CN    110119148 A * 8/2019 ........... G05D 1/0221
KR    10-1899549 B1   9/2018
(Continued)

OTHER PUBLICATIONS

Enrico Schröder, et al., "Feature Map Transformation for Multi-sensor Fusion in Object Detection Networks for Autonomous Driving", AISC, Apr. 24, 2019, pp. 118-131, vol. 944, Chapter 3.1-3.3 & Figure 1-2.
(Continued)

*Primary Examiner* — Jose L Couso
(74) *Attorney, Agent, or Firm* — Sughrue Mion, PLLC

(57) ABSTRACT

Presented are a method and a device for multi-sensor data-based fusion information generation for 360-degree detection and recognition of a surrounding object. The present invention proposes a method for multi-sensor data-based fusion information generation for 360-degree detec-
(Continued)

tion and recognition of a surrounding object, the method comprising the steps of: acquiring a feature map from a multi-sensor signal by using a deep neural network; converting the acquired feature map into an integrated three-dimensional coordinate system; and generating a fusion feature map for performing recognition by using the converted integrated three-dimensional coordinate system.

13 Claims, 8 Drawing Sheets

(58) Field of Classification Search
CPC .... G06V 10/454; G06V 10/74; G06V 10/764; G06V 10/7715; G06V 10/774; G06V 10/806; G06V 10/809; G06V 20/41; G06V 20/58; G06V 20/64; G06V 20/653; G06V 20/70; G06V 30/19173; G06V 2201/07; G06V 10/54; G06V 30/18057; G06T 5/50; G06T 3/06; G06T 3/4007; G06T 7/11; G06T 17/00; G06T 17/05; G06T 2207/1016; G06T 3/4046; G06T 5/60; G06T 9/002; G06T 2207/20076; G06T 2207/20081; G06F 18/00; G06F 18/253; G06F 18/254; G06F 18/256; G06F 18/214; G06F 18/23; G06F 18/22; G06F 18/241; G06F 18/2415; G01S 13/89; G05D 1/0221; G05D 1/0251; G05D 1/0276; H04N 7/181; G06N 3/02; G06N 3/08–088; G06N 3/0445; G06N 3/0454; G06N 3/4046; G06N 7/00; G06N 7/01; G06N 20/00; G06K 7/1482; Y10S 128/925

See application file for complete search history.

(56) References Cited

U.S. PATENT DOCUMENTS

| 2020/0160559 | A1* | 5/2020 | Urtasun | G06T 7/55 |
| 2021/0012555 | A1* | 1/2021 | Zhou | G06V 20/56 |
| 2021/0295606 | A1* | 9/2021 | Kim | G06T 17/20 |

FOREIGN PATENT DOCUMENTS

| KR | 10-2029850 B1 | 10/2019 |
| KR | 10-2019-0131207 A | 11/2019 |
| KR | 10-2019-0137087 A | 12/2019 |

OTHER PUBLICATIONS

International Search Report PCT/KR2020/010619 dated Nov. 25, 2020.

* cited by examiner

METHOD AND DEVICE FOR MULTI-SENSOR DATA-BASED FUSION INFORMATION GENERATION FOR 360-DEGREE DETECTION AND RECOGNITION OF SURROUNDING OBJECT

TECHNICAL FIELD

The present invention relates to a method and apparatus for generating fusion information based on multi-sensor data for 360-degree detection and recognition of a surrounding object.

RELATED ART

An object recognition refers to an operation of acquiring information on a region related to an object, through a detection and a region segmentation using data acquired from a variety of sensors (e.g., a camera, a LiDAR, and a radar). In particular, object detection technology using camera sensor information has been studied for a long time in the field of computer vision. Currently, with the advent of a deep neural network (DNN) structure, deep learning technology develops and accordingly, proposed are techniques that may perform an object recognition at a very high level of accuracy by learning to acquire high-dimensional feature values from a large amount of video data. Such technology is being actively applied in various fields such as autonomous driving, robotics, medical care, and smart home security. Currently, as installation of a pedestrian safety system in a vehicle is becoming mandatory, the technology is also used for technology that avoids danger by recognizing a location and a state of a pedestrian in a driver assistance system for safety. Also, as a penetration rate of autonomous vehicles increases rapidly, the demand for vehicles equipped with level-4 autonomous driving technology is also expected to increase at a very high speed.

The related art highly related to the proposed technology includes single sensor information-based object detection technology. Here, before application of deep learning technology, mainly used is technology for acquiring feature values of a video and recognizing or detecting an object through a statistical classifier using the acquired feature values in such a manner that the inventor elaborately designs techniques capable of extracting main features of data based on video data acquired from a camera sensor. For example, there is technology for recognizing or detecting an object by discovering features, such as a structure or a shape of a line of a video and by comparing the features to a known template. Representative feature extraction technology includes scale invariant feature transform (SIFT) and histogram of oriented gradients (HOG) descriptors. The SIFT refers to a method of selecting feature points easy to identify, such as a corner point, from a video and then extracting a feature vector having directivity for a local patch based on each feature point. The SIFT is a method using a feature that expresses a direction of change in surrounding brightness and a sudden degree of brightness change. The HOG refers to a vector-based method for dividing a target area into cells of a desired size and acquiring a histogram for a direction of boundary pixels for each cell and then connecting such histogram bin values in a line. The HOG is a boundary-based template matching method since direction information of a boundary is used. Also, since silhouette information of an object is used, the HOG is a method suitable for identifying an object of which an internal pattern is not complex, such as a person and a vehicle, and having unique outline information. Such techniques use known information of an object, such as an edge or a shape. Therefore, when a variety of illumination change or shape distortion, noise, occlusion, and the like, occur in video data, and when a feature value deviates from a predicted distribution, recognition performance is greatly degraded.

To overcome limitations found in a feature value-based object detection technique, deep learning technology learns a data representation method, that is, a feature value from a large amount of data using a DNN structure that is a more generalized learning model. In this case, since the data representation method is acquired through various types of data, excellent performance may be achieved against various changes and malicious elements of video information. As a conventional object detection method using a deep learning technique, proposed are techniques, such as recurrent convolutional neural network (R-CNN), a fast R-CNN, a single shot detector (SSD), and a you only look once (YOLO). With advent of deep learning object detection technique based on such video information, many 3D detection techniques capable of predicting a distance from a sensor as well as a location of an object using LiDAR sensor data are proposed. In the case of this technique, deep learning-based object detection techniques using a single sensor are proposed. Among such methods, MV3D, PIXOR, PointRCNN, STD, and the like are representative methods. Also, as a method of performing 3D object detection using multi-sensor information in addition to LiDAR sensor data, such as camera information, AVOD, ContFuse, MMF, and the like are proposed.

The conventional deep learning-based object recognition technique generally acquires a recognition result by allowing data acquired from a single data to pass through a single DNN. However, in the case of using a single sensor, dependency on the corresponding sensor significantly increases. Therefore, when the sensor data is inaccurate (e.g., a camera sensor error by strong light) or insufficient (e.g., scarcity of a LiDAR point for a distant object) due to various reasons, the recognition result becomes very inaccurate. To outperform limitations found in such single sensor recognition technique, the conventional deep learning-based object recognition technique proposes sensor fusion-based objection recognition techniques that receive input from a multi-sensor. However, in the conventional multi-sensor fusion-based object recognition technique, effective fusion is difficult since different sensor data is represented in different coordinate systems. Therefore, there is a need for a method that performs a more accurate and robust object detection and recognition by effectively fusing data represented in different coordinate systems.

Meanwhile, to perform a 360-degree recognition of a surrounding object, it needs to depend on at least one sensor. For example, in the case of using a camera, a plurality of cameras for including all viewing angles needs to be used to recognize a surrounding 360-degree environment. In this case, surrounding objects need to be recognized using a DNN for each camera signal. However, it is inefficient to independently process all camera videos as above. In this case, fusion with another LiDAR or radar sensor is difficult. Therefore, there is a need for a sensor fusion method that may construct a fused feature value by effectively fusing information acquired from a plurality of sensor signals and may extract integrated surrounding environment awareness information from the fused feature value.

DETAILED DESCRIPTION

Technical Subject

The technical subject to be achieved by the present invention provides a method and apparatus that may generate information helpful to recognize an object, such as a detection and a region segmentation, by fusing multi-sensor information of a camera, a LiDAR, and a radar, based on a deep learning network in a situation in which object recognition information for autonomous driving or a smart home environment is required.

Technical Solution

According to an aspect, a multi-sensor data-based fusion information generation method for 360-degree detection and recognition of a surrounding object proposed herein includes acquiring a feature map from a multi-sensor signal using a deep neural network (DNN); converting the acquired feature map to an integrated three-dimensional (3D) coordinate system; and generating a fusion feature map for performing recognition using the converted integrated 3D coordinate system.

The converting of the acquired feature map to the integrated 3D coordinate system includes representing a feature map expressed in a unique coordinate system of each sensor as a unified coordinate system by projecting the same to a 3D grid structure with assumption of the 3D grid structure.

According to an example embodiment, a feature map corresponding to a single continuous 3D grid structure is generated by multiplying each pixel center point of a grid structure by a coordinate transformation matrix, by projecting the same to a 3D coordinate system corresponding to each sensor, and by combining feature values around a projected point.

According to an example embodiment, an interpolated projection method of combining feature values by applying a weight inversely proportional to a relative distance between a projected point and a pixel center point is applied.

According to an example embodiment, the generating of the fusing feature map for performing recognition using the converted integrated 3D coordinate system includes concatenating or adding a corresponding feature map to a converted single 3D grid structure and then allowing the same to pass through an additional convolutional layer.

According to an example embodiment, a two-dimensional (2D) feature map in a compressed format compared to a feature map corresponding to a single 3D grid structure is acquired by averaging the feature maps based on a z-axis.

According to an example embodiment, a 3D object detection and an object detection in a bird's eye vie or a region segmentation are performed using the fusion feature map.

According to an example embodiment, an object detection or a region segmentation is performed by reconstructing precision map information around an own vehicle as a 2D image, by acquiring the feature map by applying the DNN, and by fusing the feature map acquired from the multi-sensor signal.

According to another aspect, a multi-sensor data-based fusion information generation apparatus for 360-degree detection and recognition of a surrounding object proposed herein includes a sensor data collector configured to acquire a feature map from a multi-sensor signal using a DNN; a coordinate system converter configured to convert the acquired feature map to an integrated 3D coordinate system; and a fusion feature map generator configured to generate a fusion feature map for performing recognition using the converted integrated 3D coordinate system.

Effect

According to some example embodiments, in the case of performing an object recognition using multi-sensor-based fusion information, it is possible to perform a robust and accurate object recognition by overcoming such limitations. Such accurate and robust object recognition information may be applied in an application field, such as autonomous driving, and may be importantly used in performing a task directly related to safety of a pedestrian or a driver.

BEST MODE

The present invention proposes a technique that may generate information helpful to recognize an object, such as a detection and a region segmentation, by fusing multi-sensor information of a camera, a LiDAR, and a radar, based on a deep learning network in a situation in which object recognition information for autonomous driving or a smart home environment is required. The conventional deep learning-based object recognition technique generally uses a single sensor. In this case, sensor information may be inaccurate or accurate cognitive direction may not be performed due to limitations of the sensor itself. In the case of performing an object recognition using multi-sensor-based fusion information, it is possible to perform a robust and accurate object recognition by overcoming such limitations. Such accurate and robust object recognition information may be applied in an application field, such as autonomous driving, and may be importantly used in performing a task directly related to safety of a pedestrian or a driver. Hereinafter, example embodiments will be described in detail with reference to the accompanying drawings.

Figure 1:
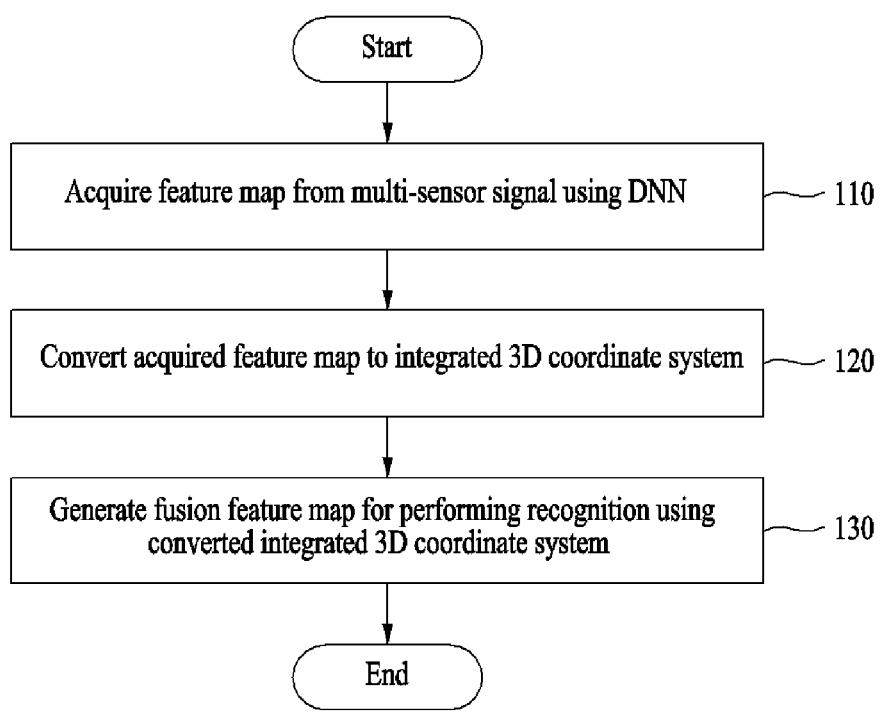
FIG. 1 is a flowchart illustrating a multi-sensor data-based fusion information generation method for 360-degree detection and recognition of a surrounding object according to an example embodiment.

FIG. 1 is a flowchart illustrating a multi-sensor data-based fusion information generation method for 360-degree detection and recognition of a surrounding object according to an example embodiment.

The proposed technology includes a structure for generating a fusion feature map capable of performing a more accurate and robust recognition by acquiring a feature map from a multi-sensor signal of at least one camera, at least one LiDAR, and at least one radar, using a deep neural network (DNN), and by converting the feature map to an integrated three-dimensional (3D) coordinate system. The present invention is to perform 3D, bird's eye view-based objection detection and region segmentation through fusion of different types of sensors.

The core of the proposed technology is to construct a fused feature map by converting feature maps extracted from all sensor signals to a single coordinate system. Also, precision map information in which a surrounding environment is reconstructed as a two-dimensional (2D) video as well as sensor information may be fused.

A multi-sensor data-based fusion information generation method for 360-degree detection and recognition of a surrounding object proposed herein includes operation 110 of acquiring a feature map from a multi-sensor signal using a DNN; operation 120 of converting the acquired feature map to an integrated 3D coordinate system; and operation 130 of generating a fusion feature map for performing recognition using the converted integrated 3D coordinate system.

In operation 110, the feature map is acquired from the multi-sensor signal using the DNN. A feature map expressed in a unique coordinate system (e.g., a camera coordinate system) of a sensor is acquired by applying the DNN to each sensor signal. Since such feature maps are expressed in different sensor coordinate systems, fusion thereof is difficult. In technology proposed to solve the above issue, such feature maps are converted based on a single 3D coordinate system.

In operation 120, the acquired feature map is converted to the integrated 3D coordinate system. Here, with assumption of a 3D grid structure, a feature map of each sensor coordinate system is converted to a grid structure and each pixel center point of the grid structure is multiplied by a coordinate transformation matrix. Then, a feature map corresponding to a single continuous 3D grid structure is generated through projection to a 3D coordinate system corresponding to each sensor and by combining feature values around a projected point. An interpolated projection method of combining feature values by applying a weight inversely proportional to a relative distance between the projected point and the pixel center point is applied for conversion to the integrated 3D coordinate system.

In operation 130, the fusion feature map for performing recognition is generated using the converted integrated 3D coordinate system. A corresponding feature map is concatenated or added to the converted single 3D grid structure and then passes through an additional convolutional layer.

The multi-sensor data-based fusion information generation method for 360-degree detection and recognition of a surrounding object may acquire a 2D feature map in a compressed format compared to a feature map corresponding to a single 3D grid structure by acquiring the 2D feature map in a bird's eye view through averaging of the feature maps based on a z-axis.

Figure 2:
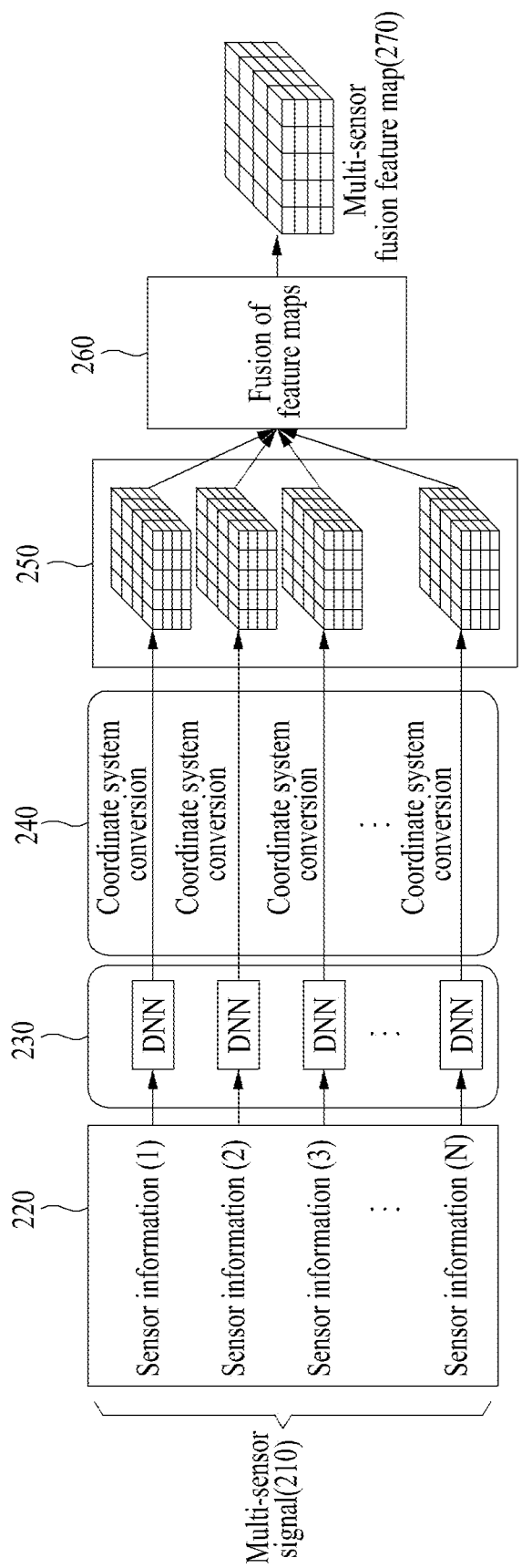
FIG. 2 illustrates a multi-sensor data fusion structure according to an example embodiment.

FIG. 2 illustrates a multi-sensor data fusion structure according to an example embodiment.

Referring to FIG. 2, the proposed method acquires a feature map expressed in a unique coordinate system (e.g., a camera coordinate system) of a sensor by applying DNNs 230 to sensor information 220 of sensor signals 210, respectively. Since such feature maps are expressed in different sensor coordinate systems, fusion thereof is difficult. In technology proposed to solve this, the feature maps are converted based on a single 3D coordinate system through a process 240. To this end, with assumption of a 3D grid structure 250 of FIG. 2, a feature map of each sensor coordinate system is converted to a grid structure. A continuous feature map 270 is generated by multiplying a center point of each grid element by a coordinate transformation matrix, by projecting the same to a coordinate system corresponding to each sensor, and by combining feature values around a projected point through a process 260. That is, since a location of the projected point does not accurately match a center of a pixel of a feature map of a sensor coordinate system, an interpolated projection method of combining feature values by applying a weight inversely proportional to a relative distance between the projected point and a pixel center is applied to prevent generation of a discontinuous feature map. As such, when a feature map for each sensor is converted to a feature map corresponding to a single 3D grid structure through the proposed interpolated projection method, feature maps expressed using a single 3D coordinate system are fused. To this end, the converted feature maps are concatenated or added and then pass through an additional convolutional layer. Using the fused feature map, a recognition, such as object detection or region segmentation, is performed based on a 3D, a bird's eye view, and the like.

Figure 3:
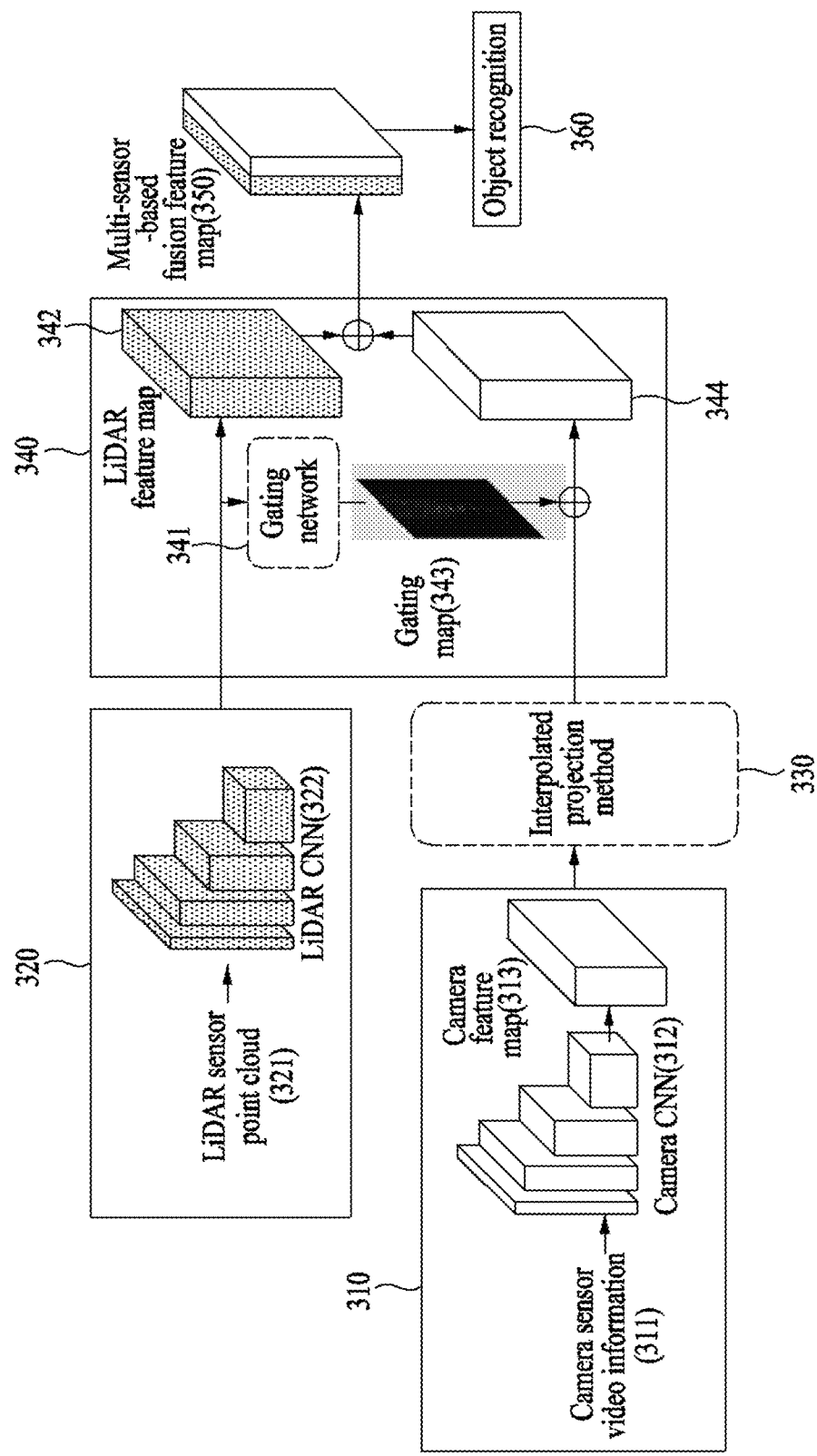
FIG. 3 illustrates LiDAR camera sensor fusion technology according to an example embodiment.

FIG. 3 illustrates LiDAR camera sensor fusion technology according to an example embodiment.

FIG. 3 illustrates a structure of performing a 3D object detection by fusing camera information 310 and LiDAR information 320 as an example. Video information 311 acquired from a camera sensor is used to acquire a feature map 313 based on a camera coordinate system using a camera convolutional neural network (CNN) structure 312. In the case of a LiDAR sensor signal, data is generally represented as a LiDAR sensor point cloud 321 that is a set of points and a LiDAR feature map 342 is acquired by dividing points using a 3D grid structure and by separately encoding points of each grid structure element. Since the camera feature map 313 and the LiDAR sensor-based feature map 342 acquired as above are expressed in different coordinate systems, fusion thereof is difficult. To solve this, a feature map corresponding to a camera is converted based on the 3D grid structure and fused (340).

Figure 7:
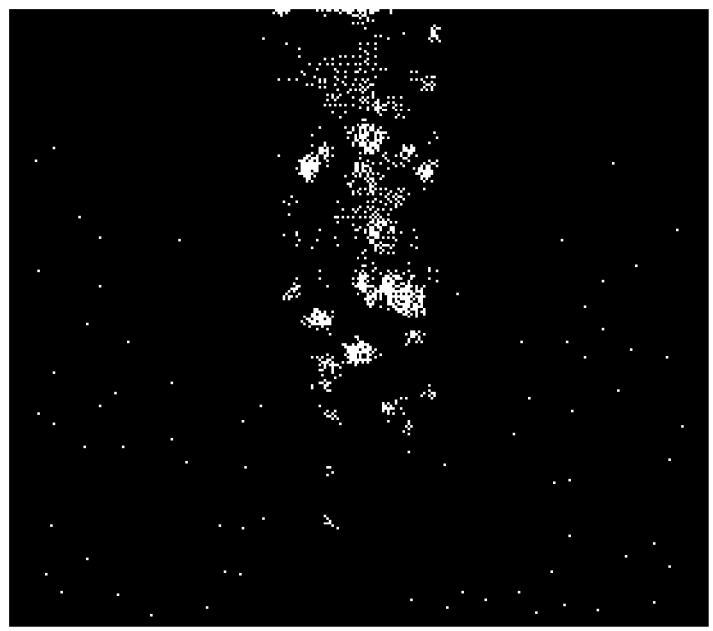
FIG. 7 illustrates an example of a use effect of a gating network according to an example embodiment.

To this end, a final camera domain feature map for fusion is acquired by multiplying a camera feature map 344 converted to a LiDAR domain through the aforementioned interpolated projection method 330 by a gating map 343 generated using a gating network 341. Here, the gating network 341 is configured as a CNN that uses a LiDAR feature map as an input and generates the gating map 343 having the same size as that of the converted camera feature map as an output. Through this gating process, the camera feature map is acquired in a form that may assist a 3D object detection as shown in FIG. 7.

In the case of converting the camera feature map based on a 3D grid structure, feature maps of a camera and LiDAR are expressed as an integrated coordinate system. Therefore, through a simple concatenation or addition, effective fusion may be performed. Meanwhile, in an application field, such as autonomous driving, a z-axial location of an object does not significantly vary since surrounding objects mostly are present at the same height. Therefore, a 2D feature map in a direction of a bird's eye view may be acquired by averaging the aforementioned feature maps based on the z-axis. In this case, a 2D feature map in a compressed format compared to the feature map allocated to the 3D grid structure may be acquired. A recognition function is performed by applying an additional network for 3D object detection and region segmentation to the fused feature map.

Figure 4:
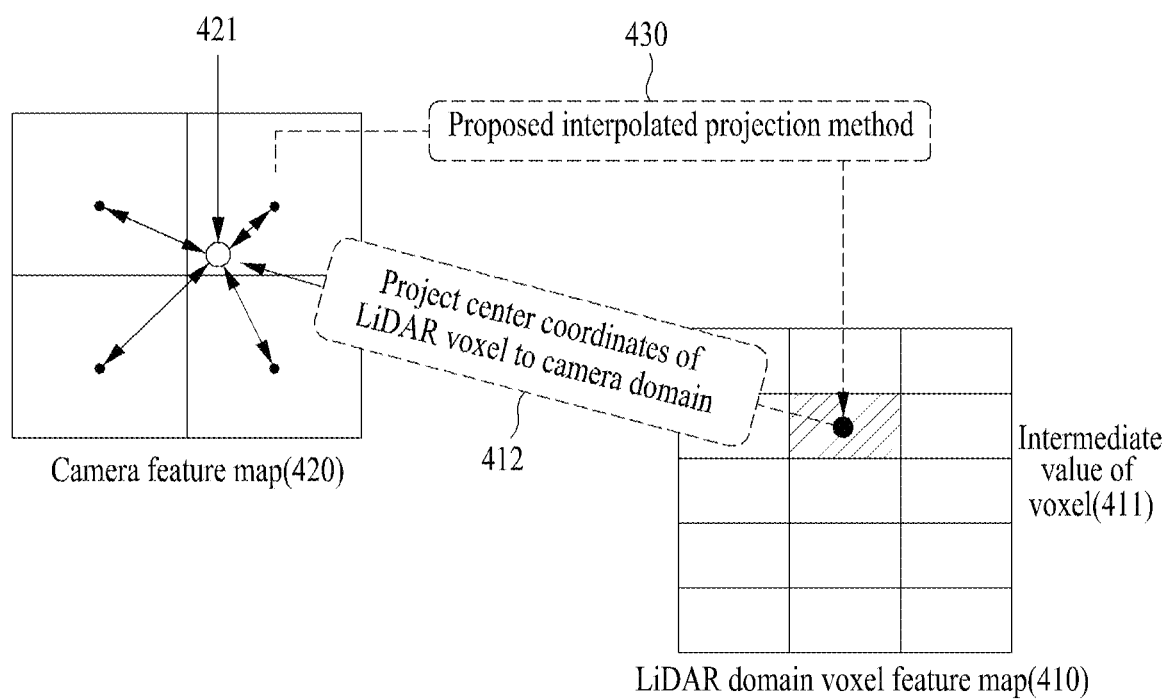
FIG. 4 illustrates a linear interpolated projection method applied when converting a coordinate system of a feature map according to an example embodiment.

FIG. 4 illustrates a linear interpolated projection method applied when converting a coordinate system of a feature map according to an example embodiment.

FIG. 4 illustrates a coordinate system conversion using an interpolated projection method proposed herein. A grid structure of a 3D coordinate system is acquired (430) by multiplying a center point 411 of each element of a 3D grid structure that is a LiDAR domain voxel feature map 410 by a coordinate transformation matrix and by projecting the same to a camera coordinate system 421 of a camera feature map 420 (412), and by combining feature values around a projected point. To prevent discontinuity that occurs during conversion to a coordinate system, when filling a camera grid structure with a value of a feature map as shown in FIG. 4, a distance between conversion coordinates and a surrounding feature value is calculated instead of using a single value of a corresponding camera feature map and a mixed value is used as a smaller ratio for a greater distance and as a greater ratio for a closer distance.

Figure 5:
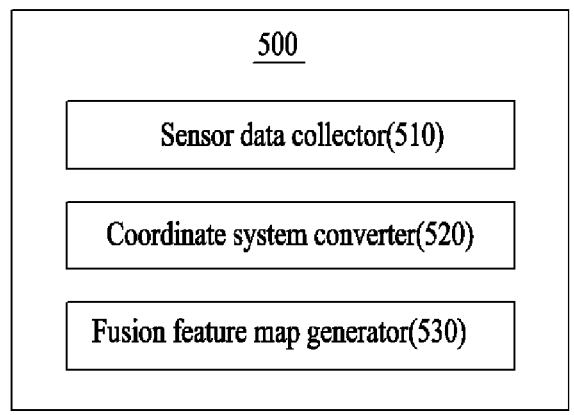
FIG. 5 illustrates a configuration of a multi-sensor data-based fusion information generation apparatus for 360-degree detection and recognition of a surrounding object according to an example embodiment.

FIG. 5 illustrates a configuration of a multi-sensor data-based fusion information generation apparatus for 360-degree detection and recognition of a surrounding object according to an example embodiment.

A multi-sensor data-based fusion information generation apparatus 500 for 360-degree detection and recognition of a surrounding object includes a sensor data collector 510, a coordinate system converter 520, and a fusion feature map generator 530.

The sensor data collector 510 acquires a feature map from a multi-sensor signal using a DNN. The sensor data collector 510 acquires a feature map expressed in a unique coordinate system (e.g., a camera coordinate system) of a sensor by applying the DNN to each sensor signal. Since such feature maps are expressed in different sensor coordinate systems, fusion thereof is difficult. In technology proposed to solve the above issue, such feature maps are converted based on a single 3D coordinate system.

The coordinate system converter 520 converts the acquired feature map to an integrated 3D coordinate system.

The coordinate system converter 520 generates a feature map corresponding to a single continuous 3D grid structure by assuming a 3D grid structure, by converting a feature map of each sensor coordinate system to a grid structure, by multiplying each pixel center point of the grid structure by a coordinate transformation matrix, by projecting the same to a 3D coordinate system corresponding to each sensor, and by combining feature values around a projected point. The coordinate system converter 520 applies an interpolated projection method of combining feature values by applying a weight inversely proportional to a relative distance between a projected point and a pixel center point.

The fusion feature map generator 530 generates a fusion feature map for performing a recognition using the converted integrated 3D coordinate system. The fusion feature map generator 530 concatenates or adds a corresponding feature map to the converted single 3D grid structure and allows the same to pass through an additional convolutional layer.

The multi-sensor data-based fusion information generation apparatus 500 for 360-degree detection and recognition of a surrounding object proposed herein may acquire a 2D feature map in a compressed format compared to a feature map corresponding to a single 3D grid structure by acquiring a 2D feature map in a bird's eye view through averaging of the feature maps based on the z-axis.

The proposed multi-sensor data-based fusion information generation apparatus for 360-degree detection and recognition of a surrounding object overall operates as follows. Signals are acquired using a LiDAR sensor, multiple cameras including all viewing angles, and multiple radar sensors to collect surrounding 360-degree information. Such signals are transmitted to a central computer and the computer generates a feature map expressed in a unique coordinate system of a sensor by applying a DNN. Then, all the feature maps are converted using the proposed interpolated projection method to generate a continuous feature map for conversion based on a 3D grid structure. Since conversion is performed based on the same grid structure, the converted feature maps have the sample size and resolution, and sensor information may be used through a simple concatenation or addition operation.

Since a precision map provides important information on a surrounding environment, precision map information on the surrounding environment may be fused with sensor information. To this end, the precision map information is reconstructed as a 2D video and a feature map is extracted through a CNN structure. The extracted feature map is converted again to a grid coordinate system and map information is fused with the feature map derived from the sensor.

The proposed technology solves the issues found in the related art as follows. Initially, the conventional deep learning-based object recognition technology using only a single sensor performs an object recognition by depending on a single sensor. Therefore, if quality of sensor data is degraded, a recognition result may become inaccurate. However, in the case of performing an object recognition through the proposed multi-sensor-based fusion feature map, it is possible to generate fusion information in a form that compensates for shortcomings of each sensor and to improve object recognition performance. Also, the conventional multi-sensor-based object recognition technology merges sensor information using an early fusion method or a late fusion method. Compared to this, in the case of merging multi-sensor information using the proposed mid-end fusion information generation technology, it is possible to overcome limitations found in the conventional fusion technique.

Herein, proposed is technology that may improve detection performance by using all of local information and global information when performing object detection using a deep learning technique. The proposed method may perform an efficient object recognition based on understanding about a surrounding object of an object by constructing each of a network for acquiring local information in which the object is present and a network for acquiring global information on the surrounding environment to which the object belongs in a DNN that uses camera sensor data as an input. In a recent smart home environment or in an autonomous driving environment, camera sensor data is expected to be used to perform an object detection and, at the same time, perform understanding of the surrounding environment to which the object belongs when performing the object detection. The proposed method suggests a solution capable of effectively performing such object detection and understanding of the surrounding environment. The proposed method may apply to various artificial intelligence technologies for recognizing an environment or an object as well as a smart phone or autonomous driving.

Figure 6A:
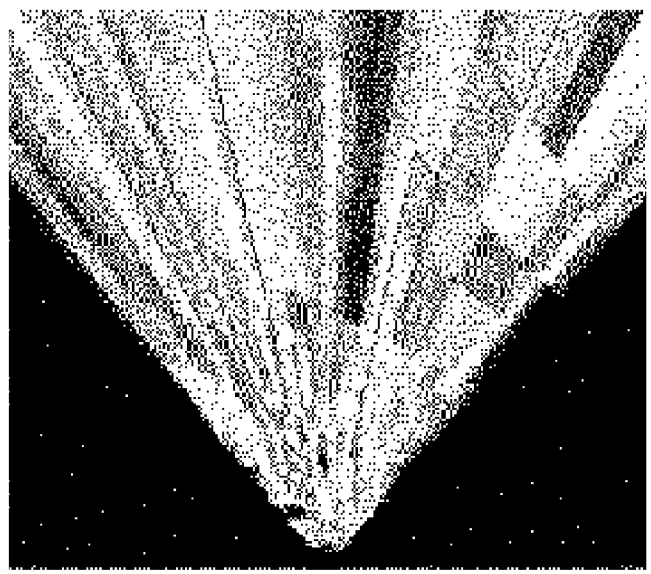
FIG. 6A illustrates an example without an interpolated projection method according to an example embodiment.

FIG. 6A illustrates an example without an interpolated projection method according to an example embodiment.

Figure 6B:
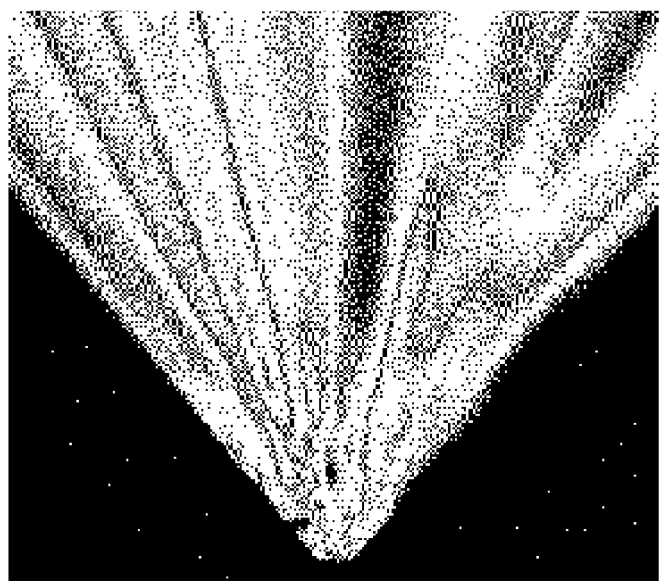
FIG. 6B illustrates an example of a use effect of an interpolated projection method according to an example embodiment.

FIG. 6B illustrates an example of a use effect of an interpolated projection method according to an example embodiment.

To prevent discontinuity that occurs during conversion to a coordinate system, when filling a camera grid structure with a value of a feature map as shown in FIG. 4, a distance between conversion coordinates and a surrounding feature value is calculated instead of using a single value of a corresponding camera feature map and a mixed value is used as a smaller ratio for a greater distance and as a greater ratio for a closer distance. Accordingly, referring to FIG. 6B, in the case of using the interpolated projection method, it is possible to generate a smooth and continuous feature map during coordinate system conversion.

FIG. 7 illustrates an example of a use effect of a gating network according to an example embodiment.

A final camera domain feature map for fusion is acquired by multiplying a camera feature map converted to a LiDAR domain Through the aforementioned interpolated projection method by a gating map generated using a gating network. Here, the gating network is configured as a CNN that uses a LiDAR feature map as an input and generates the gating map having the same size as that of the converted camera feature map as an output. Through this gating process, the camera feature map is acquired in a form that may assist a 3D object detection as shown in FIG. 7.

The multi-sensor data-based fusion information generation technology proposed herein may apply in various object recognition fields, such as a multi-object detection, an object region segmentation, and an object motion prediction. A representative applicable field may include the field of an autonomous vehicle and a smart home. First, in the field of the autonomous vehicle, cognitive information on a surrounding environment and vehicle and a pedestrian needs to be provided in advance most importantly to perform a subsequent operation, that is, a prediction and a determination. Since recognition accuracy is also directly related to safety, the recognition accuracy is most important. Since various sensors are mounted to an autonomous vehicle, the proposed multi-sensor information fusion technology may achieve stability of the autonomous driving environment and improvement of prediction accuracy by improving accuracy of object recognition information. Second, in the field of the smart home environment, it is possible to predict and prevent a dangerous situation based on recognition of a person or an object using a home camera and it is possible to assist determination related to an operation of a product with Internet of things (IoT) being mounted based on accurate recognition information.

To apply this technology, there is a method of acquiring data using various sensors of a LiDAR, a camera, etc., and fusing the acquired data and multi-sensor information acquired from an embedded system including a graphic processor unit (GPU), etc., with the proposed technology, and then performing an objection recognition algorithm. To this end, multi-sensor data related to various environments is secured in advance and used to train a DNN structure. The trained DNN is stored as an optimized network coefficient, which is applied to the embedded system. In this manner, the object recognition algorithm is performed on test data that is input in real time and a result thereof is acquired.

Multi-sensor-based object detection technology using deep learning may be currently applicable to a smart home camera, autonomous driving, a mobile robot, and the like. Based on this technology, it is expected to perform more complex functions beyond recognition in the future, such as tracking an object, verifying a relationship between objects, and predicting the future through understanding of an environment. For example, in a smart home environment, in the case of performing a robust object recognition against an interference element of sensor data by fusing multi-sensor information, it is possible to predict and prevent a dangerous situation. Also, in an autonomous driving environment, it may be used for an advanced task, such as automated surveillance and traffic monitoring. Such an object detection algorithm based on multi-sensor fusion technology is directly related to safety of a person and may be regarded as one of representative artificial intelligence technologies that are basis for future technologies.

The apparatuses described herein may be implemented using hardware components, software components, and/or a combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer methods and recorded in computer-readable media. The media may include, alone or in combination with program instructions, a data file, a data structure, and the like. The program instructions recorded in the media may be specially designed and configured for the example embodiments or may be known to one of ordinary skill in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of the program instruction may include a machine language code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made from the above description. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A method of generating fusion information based on multi-sensor data, the method comprising:
   acquiring a feature map from a multi-sensor signal using a deep neural network (DNN);
   converting the acquired feature map to an integrated three-dimensional (3D) coordinate system;
   generating a fusion feature map for performing recognition using the converted integrated 3D coordinate system; and
   detecting at least one surrounding object by performing, using the fusion feature map, at least one of object detection or region segmentation,
   wherein the generating of the fusion feature map comprises combining feature values of the feature map by applying, to each of the feature values, a weight that is inversely proportional to a relative distance between a projected point and a pixel center point.

2. The method of claim 1, wherein the converting of the acquired feature map to the integrated 3D coordinate system comprises representing a feature map expressed in a unique coordinate system of each sensor as a unified coordinate system by projecting the same to a 3D grid structure with assumption of the 3D grid structure.

3. The method of claim 2, wherein a feature map corresponding to a single continuous 3D grid structure is generated by multiplying each pixel center point of the 3D grid structure by a coordinate transformation matrix, by projecting the same to a 3D coordinate system corresponding to each sensor, and by combining feature values around a projected point.

4. The method of claim 1, wherein the generating of the fusing feature map for performing recognition using the converted integrated 3D coordinate system comprises concatenating or adding a corresponding feature map to a converted single 3D grid structure and then allowing the same to pass through an additional convolutional layer.

5. The method of claim 1, wherein a two-dimensional (2D) feature map in a compressed format compared to a feature map corresponding to a single 3D grid structure is acquired by averaging the feature maps based on a z-axis.

6. The method of claim 5, wherein a 3D object detection and an object detection in a bird's eye view or a region segmentation are performed using the fusion feature map.

7. The method of claim 1, wherein an object detection or a region segmentation is performed by reconstructing precision map information around an own vehicle as a 2D image, by acquiring the feature map by applying the DNN, and by fusing the feature map acquired from the multi-sensor signal.

8. An apparatus for generating fusion information based on multi-sensor data, the apparatus comprising:
   a memory storing instructions; and
   one or more processors communicatively coupled to the memory,
   wherein the instructions are configured to, when individually or collectively executed by the one or more processors, cause the apparatus to:
   acquire a feature map from a multi-sensor signal using a deep neural network (DNN);
   convert the acquired feature map to an integrated three-dimensional (3D) coordinate system;
   generate a fusion feature map for performing recognition using the converted integrated 3D coordinate system; and
   detect at least one surrounding object by performing, using the fusion feature map, at least one of object detection or region segmentation,
   wherein to generate the fusion feature map comprises to combine feature values of the feature map by applying, to each of the feature values, a weight that is inversely proportional to a relative distance between a projected point and a pixel center point.

9. The apparatus of claim 8, wherein the instructions are further configured to, when individually or collectively executed by the one or more processors, cause the apparatus to:
   represent a feature map expressed in a unique coordinate system of each sensor as a unified coordinate system by projecting the same to a 3D grid structure with assumption of the 3D grid structure.

10. The apparatus of claim 9, wherein the instructions are further configured to, when individually or collectively executed by the one or more processors, cause the apparatus to:
    generate a feature map corresponding to a single continuous 3D grid structure by multiplying each pixel center point of a grid structure by a coordinate transformation matrix, by projecting the same to a 3D coordinate system corresponding to each sensor, and by combining feature values around a projected point.

11. The apparatus of claim 8, wherein the instructions are further configured to, when individually or collectively executed by the one or more processors, cause the apparatus to:
    concatenate or add a corresponding feature map to a converted single 3D grid structure and then allow the same to pass through an additional convolutional layer.

12. The apparatus of claim 8, wherein the instructions are further configured to, when individually or collectively executed by the one or more processors, cause the apparatus to:
    acquire a two-dimensional (2D) feature map in a compressed format compared to a feature map corresponding to a single 3D grid structure by averaging the feature maps based on a z-axis.

13. The apparatus of claim 8, wherein the instructions are further configured to, when individually or collectively executed by the one or more processors, cause the apparatus to:
    perform a 3D object detection and an object detection in a bird's eye vie or a region segmentation using the fusion feature map.

* * * * *